United States Patent [19]

Lindgren

[11] 3,902,023

[45] Aug. 26, 1975

[54] LOUD SPEAKING TELEPHONE SET

[75] Inventor: Owe Gunnar Lindgren, Farsta, Sweden

[73] Assignee: Telefonaktiebolaget LM Ericsson, Stockholm, Sweden

[22] Filed: Nov. 23, 1973

[21] Appl. No.: 419,705

[30] Foreign Application Priority Data

Dec. 18, 1972 Sweden ............................ 16533/72

[52] U.S. Cl. ............................................. 179/81 B

[51] Int. Cl.² .......................................... H04M 1/00

[58] Field of Search...179/81 B, 1 HF, 1 VC, 100 L, 179/81 A, 81 R, 1 VL

[56] References Cited

UNITED STATES PATENTS

| | | | |
|---|---|---|---|
| 3,171,901 | 3/1965 | Clemency et al. | 179/81 B |
| 3,395,255 | 7/1969 | Clement | 179/81 B |
| 3,461,240 | 8/1969 | Lindgren | 179/81 B |
| 3,562,791 | 11/1968 | Baker | 179/1 HF |
| 3,745,262 | 7/1973 | Brolin et al. | 179/81 B |

*Primary Examiner*—Kathleen H. Claffy
*Assistant Examiner*—Joseph Popek
*Attorney, Agent, or Firm*—Hane, Baxley & Spiecens

[57] ABSTRACT

A loud speaking telephone set for receiving a line signal has a transmitter channel and a receiver channel which contain controlled amplifiers and controlled attenuators, respectively. A comparator unit compares the signal level of both channels and in dependence on the comparison delivers a control signal to the amplifiers and to the attenuators for bringing the set into its transmitting and receiving modes. A level detector detects the signal level of the receiver channel and, if the detected level exceeds a predetermined level, a voltage value is gradually fed to an analog memory unit and thereafter added to the control signal. The value stored by the analog memory unit which is dependent on the time during which the detected signal level is greater than the predetermined level determines the quiescent attenuation of the controlled attenuators, i.e. the attenuation of the attenuators in absence of a line signal.

5 Claims, 4 Drawing Figures

LOUD SPEAKING TELEPHONE SET

The present invention relates to a loud speaking telephone set, in which there is an automatic adjustment of the attenuators and the amplifiers included in the set to the actual signal level of the telephone line.

The invention can be used for low speaking as well as for loud speaking telephone sets, but it is especially suitable for loud speaking telephone sets.

It is known in the art is to arrange variable attenuators in the transmitter channel and in the receiver channel of a loud speaking telephone set, see for example the Swedish Pat. No. 337,846. These variable attenuators have a control range between minimum and maximum attenuation which is determined by among other things, the acoustic attenuation between the loud speaker and the microphone. The magnitude of the control range is also dependent on the requirements as to, on the one hand, the line level at a certain acoustic pressure on the microphone of the set, on the other hand, on the acoustic pressure which is desired from the loud speaker at a certain line signal. The problem associated with the acoustic control ia magnified as the value of the control range of the variable attenuators becomes greater. Therefore it is desirable that this control range be kept as low as possible. In order to be able to detect and listen-in to low line levels in certain sets, the so-called quiescent attenuation is adjusted to near zero, so that already weak signals will not become further attenuated. This results in a deterioration in the transmitter channel, however, because when switching the set from the receiving channel to the transmitting channel, the above-mentioned control range will be disproportionately great.

Swedish Pat. No. 339,704 shows an amplifier arrangement in a telephone set according to the present invention. This known arrangement comprises, in the transmitter channel a number of uncontrolled as well as controlled amplifiers connected between the microphone and the line and comprises in the receiver channel a number of likewise uncontrolled as well as controlled attenuators connected between the loud speaker of the set and the line. The controlled units are controlled by a comparator circuit in such a way that, for all control voltages, there is a constant amplication between the microphone and the loud speaker for the purpose of avoiding feedback oscillation in the set. By means of an automatic volume control the incoming line level can be treated by the receiver channel via the comparator circuit, so that if the output level from the receiver amplifier exceeds a predetermined level, the controllable attenuating circuit in the receiver channel is controlled from a relatively low degree of attenuation to a relatively high degree of attenuation. Such volume control contains furthermore a flip-flop as a memory circuit, which is arranged to assume a state corresponding to a relatively low degree of attenuation each time the state of the direct voltage on the line is considerably changed. The change of the attenuation in the receiver channel thus takes place digitally or in descrete steps as a function of the sensed level in the amplifier of the receiver channel without considering how the changes from the automatic volume control influence the control process in the comparator circuit. In the known arrangement thus there is not utilized the qualities of the controllable attenuator as, for example, variable quiescent attenuation and continuous control of the attenuation in order to continuously control the loud speaking set.

An object of the present invention is to obtain a suitable continuous control of the controllable attenuators included in the set for every switching case when transmitting and receiving in dependence on the sensed level of the incoming telephone line and in dependence on the sensed signal level from the receiver channel of the loud speaking telephone set, and to influence a comparison circuit in the set in dependence on the quantities thus sensed in order to detect also very weak receiving signals correctly. Another object of the present invention is to facilitate the switching between the transmitting and the receiving state of the set when strong signals appear on the line.

The invention, the characteristics of which appear from the appended claims, will be described more in detail with reference to the accompanying drawings in which:

Figure 1:
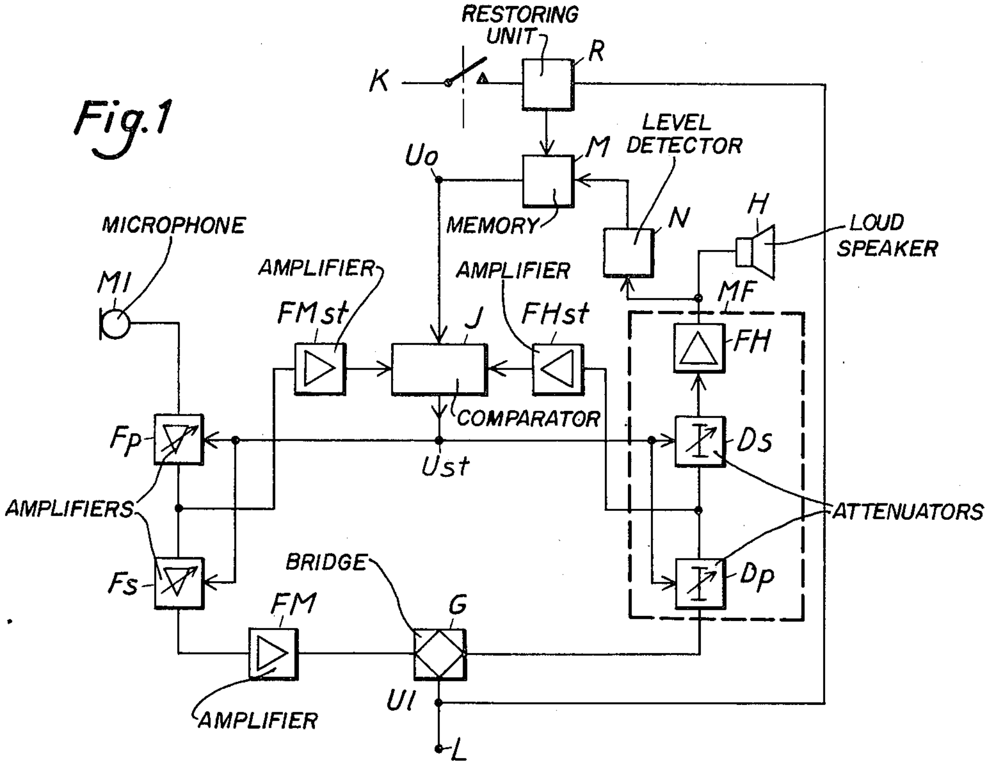
FIG. 1 illustrates in a block diagram a loud speaking telephone set according to the principle of the present invention.

In FIG. 1 a block diagram of a loud speaking telephone set according to the present invention is shown. Like in the known set, the present set contains in the transmitter channel controlled amplifiers Fp and Fs and an uncontrolled amplifier FM, which are connected between the microphone MI of the set and the line L via a bridge circuit G. The receiver channel contains the controlled attenuators Dp and Ds and the amplifier FH, which units are connected between the fork circuit G, connected to the line L and the loud speaker H of the set. The units Dp, Ds and FH constitute the receiver amplifier MF. A comparatof unit J is with its two inputs via the fixed amplifiers FMst and FHst, respectively, connected to a junction between the amplifiers Fp and Fs, and to a junction between the attenuators Dp and Ds, respectively, for the transmitter and the receiver channel, respectively. The comparator unit J senses and compares herewith the signal level in the transmitter and the receiver channels, the difference between these two levels being indicated. In dependence on this difference a control voltage Ust is delivered across to the output of the comparator. If then the level of the transmitter channel is greater than the level of the receiver channel (the transmitting mode), then voltage Ust > Uo, where Uo is a control voltage dependent on the level of the line signal. This implies that the amplification or amplifiers Fp and Fs like the attenuation of the controlled attenuators Dp, Ds should increase. If, on the contrary the level in the transmitter is less than the level in the receiver (receiving mode), then voltage Ust <Uo and a decrease of the amplification takes place. The resulting amplification between the loud speaker and the microphone will thus be unchanged independent of the value of voltage U*st*.

By N a level indicator for indication of the signal level to the loud speaker H is indicated. When the level of the output signal from the receiver amplifier MF exceeds a predetermined level of the level detector N, a memory unit M connected to the output of the level detector is influenced, so that gradually a voltage value will be stored in the unit M. More precisely, this value is dependent on the time during which the output signal from the receiver amplifier MF exceeds said level and the storing of the value takes place by means of integration of the output signal from the level detector N during said time. In dependence on the value stored, the memory unit will deliver from its output a signal Uo, which constitutes to control voltage fed to the comparator unit and which influences the comparator unit J. This value is added to the control signal UJ which is produced in the comparator unit (See FIG. 3) in dependence on the comparison between the voltage values from the outputs of the amplifiers FHst and FM*st*, thus $U_{st} = U_o + UJ$. In the receiving mode of the set, as will be described more in detail below, a control of the attenuators D*p* and D*s* will take place in dependence on the value of the control voltage U*st*, which in turn is dependent on the value U*o* stored in the memory unit M. The quiescent value of the attenuators D*p* and D*s* is the attenuation value of these when the comparator unit J is not influenced, that is when UJ = 0. This quiescent value increases if U*o* increases. In the receiving mode, the control signal UJ decreases the attenuation in the attenuators Dp and Ds from the quiescent value to a minimum value. If the level of the receiver amplifier MF exceeds the value of the level detector N, then the value stored in the memory unit M is increased so that the voltage U*o* increases. The voltage increase is proportional to the time during which the level exceeds the value produced by the level detector N. For increasing voltage Uo, the attenuation of the attenuators D*p* and D*s* increases until the level from the receiver amplifier MF does not exceed the value of the level detector N, the memory unit M holding the value of voltage Uo thus obtained when the line signal ceases. The purpose of the memory unit M is, dependent on a signal detected in a level indicator and obtained from the receiver amplifier of the set, to store a value which is dependent on the time during which the obtained signal is greater than the predetermined signal level of the level detector N. This value then determines the quiescent attenuation which the attenuators have in the absence of a line signal or at such a low line signal level that the comparator unit J is not influenced by the amplifier FH*st*. When a line signal appears on the output of the receiver amplifier MF and this signal is detected by the comparator unit J the attenuators will be controlled to their minimum attenuation level corresponding to the detected line signal.

There is also connected to the memory unit M a restoring R having, one of its inputs connected to the incoming line L for sensing the line level and another input connected to a contact K for manually restoring the memory unit M. When the direct voltage of the time drops to zero, which, for example, takes place at pole inversion and number dialling, the restoring unit R will deliver a zero setting signal to the memory unit M. The value stored in the memory unit M will then be erased and the voltage contribution which was previously fed to the comparator unit J will disappear. Hence the control voltage U*st* like the attenuation in the attenuation D*p*, D*s* will decrease. The receiver amplifier MF is then adjusted to its maximum amplification. Thus a weak signal level from the line can again be indicated in the receiving mode and, in dependence on the loud speaking signal sensed from the level indicator N, a new value can now be fed to the memory unit M. This operation can occur, for example, in the case when a ringing tone from a local exchange has been received, the memory unit M being influenced and a control signal U*o* being added to the signal UJ produced by the comparator unit for adjustment of the controllable attenuators Dp, Ds. When the user of the set then dials, the line will be short-circuited, and the value stored in the memory element being erased. Accordingly the influence on the comparator unit J ceases and the control voltage U*st* will not obtain a contribution from the memory unit M. Thus the attenuators D*p*, D*s* will be restored to a low attenuation value and there will be maximum amplification in the receiver amplifier MF. When the called subscriber has dialled the subscriber's number, the line signal thus appearing is detected by the level indicator N with maximum amplification in the receiver amplifier MF. After that a control of the loud speaker signal takes place as described previously. If the signal is strong, the memory unit will again be influenced. When the B-subscriber answers, generally a pole inversion takes place and the memory unit is zero-set, whereby the quiescent voltage U*o* decreases and consequently the control voltage Ust. The receiver amplifier MF is again adjusted to maximum amplification. After each zero setting of the memory unit M the attenuators Dp, Ds in the receiver will be adjusted on their minimum attenuation and will be adjusted to their quiescent attenuation when the line signal has ceased but no zero-setting has taken place. As it will be described more in detail in connection with FIG. 2, the attenuators will only need to be controlled to a small attenuation value around their quiescent attenuation level when returning from low to high line signal level. Since the memory unit M stores analog values analog values of the quiescent attenuation can be adjusted.

Figure 2:
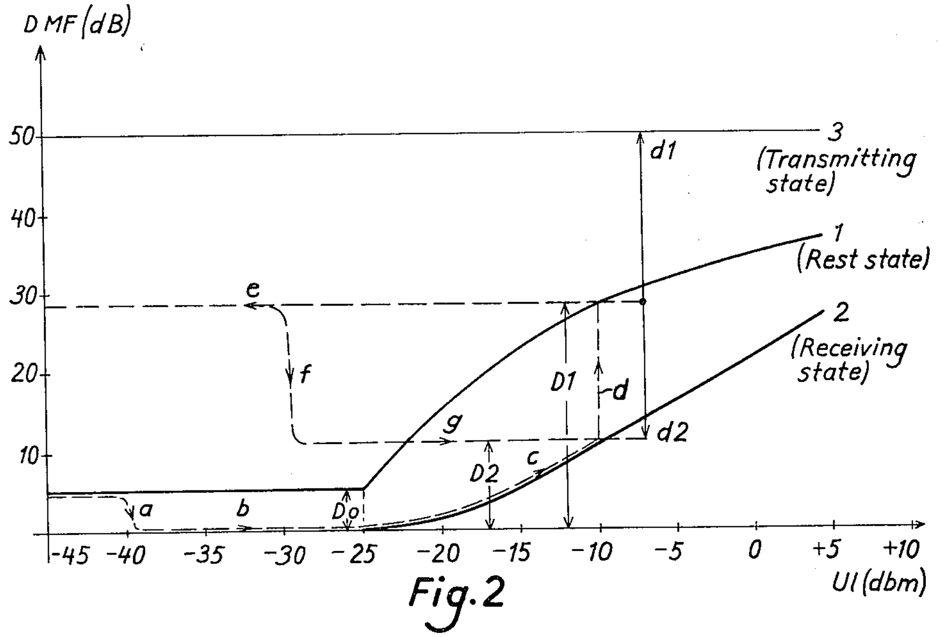
FIG. 2 shows a curve of the attenuation characteristic of the receiver amplifier included in the set according to the present invention as a function of the incoming line level.

With reference to the diagram according to FIG. 2 the function of the receiver amplifier MF will be described more in detail. The diagram shows the attenuation characteristic $D_{MF}$ of the receiver amplifier MF in dependence on the level of the incoming line signal. Curve 1 illustrates the progress of the quiescent attenuation characteristic, which attenuation is obtained in the attenuators D*p*, D*s* for the value of the control voltage U*st*, when there is no influence on the comparator unit J from the amplifiers FMst and FHst The adjustment of the attenuators is in this case dependent only on the bias voltage Uo obtained from the memory unit M which has stored the greatest line signal sensed quiescent attenuation. Curve 1 of FIG. 2 is as a function of this value. In the level indicator N there is set a determined threshold-value, for example −25 dBm. When the level of the incoming line signal is lower than −25 dBm the level indicator N will not be influenced and no storing in the memory unit M will take place. A predetermined quiescent attenuation D*o* is thus adjusted in the attenuators D*p*, D*s*. When the level of the line signal exceeds −25 dBm the level indicator N is activated and storing in the memory unit M is initiated, implying that the bias voltage to the comparator unit J is increased and the quiescent attenuation value increases according to curve 1. Curve 2 indicates the minimum attenuation of the receiver amplifier MF as a function of the level of the incoming line signal, that is when the set is in the receiving mode and the comparator unit J is influenced by the amplifier FH*st*. For line signals have levels less than −25 dBm this attenuation is practically equal to zero. When the level increases above −25 dBm, the minimum attenuation gradually increases. Curve 3 indicates the attenuation of the receiver amplifier in the transmitting mode, that is when the level from amplifier FMst is higher than that from amplifier FHst. This attenuation is thus constant and independent of the level of the incoming line signal.

When the set is to be used, the receiver amplifier MF is adjusted to a quiescent attenuation value Do, as no or a very weak line signal appears. This value D*o* is located on a low level, acording to the example in FIG. 2 on 5 dB, so that already weak line signals will not be further significantly attenuated. When the line signal gradually increases, the value is exceeded, comparator unit J is influenced, arrow a, and a control of the receiver amplifier MF takes place whereby the attenuation decreases to its minimum value, arrow *b*. The attenuation will henceforth follow the minimum attenuation curve 2 when the line signal increases, as it is indicated by arrow c. At the arrow d, the line signal has ceased after having attained a maximum value of, for example, −10 dBm and in absence of a line signal the attenuation in the receiver amplifier is determined by the quiescent attenuation value D1, which, according to the example, has been chosen equal in 28 dB. The set can now be controlled to its transmitting mode within a control range of only (50–28) = 22 dB, instead of 45 dB in the case when the memory unit M is not influenced. When the line signal again increases after having decreased to a low value, arrow *e* and arrow *f*, respectively, the comparator J is influenced and the attenuation $D_{MF}$ drops to the level D2 dependent on the influence of the value stored in the memory unit M. This attenuation value, arrow *g*, is maintained as long as the line signal level is below the value −10 dBm, that is the value of the latest obtained maximum line signal. By the arrows *d*1 and *d*2 the controlling range when transmitting and receiving, respectively, is illustrated.

The blocks shown in FIG. 1 can be designed in different ways within the scope of the inventive idea. As an example, the embodiment according to FIG. 3 will be described in more detail.

The level detector N consists of a circuit known per se, for example, a Schmit trigger or a transistor stage in which, between the base and the emitter, a resistor is connected and an input resistor connected to the base. To the output of the level indicator a transistor Q1 operating as a switch is connected, which transistor is brought to its conducting state when the level indicator N is activated.

The memory unit M consists of an operational amplifier OP, between the negative input and output of which a parallel connection of the capacitor Cm and the resistor Rm is connected. The negative input of the memory unit is connected to the transistor Q1 via the resistor R2 and its positive input is connected to a reference potential Uref.

The restoring unit R consists of a monostable multivibrator circuit of known design having an input connected to the line L according to FIG. 1. By K a contact is indicated, which, when manually activated, influences the state of the multivibrator in the same way as if a zero setting signal from the line L should appear on the input thereof. In other words, contact K is a manually operable pulse generator. The output of the multivibrator is connected to the base of a transistor Q2, the collector of which is connected to the memory unit M via the resistor R1.

The comparator unit J consists of two identical blocks J1 and J2 each containing a rectifier for the input voltages UM and UH from the amplifier FM*st* and FH*st*, respectively, and a diode D connected to the connection point *b* between the blocks J1 and J2 and the output of the memory unit M. The comparator unit is thus arranged to deliver a control voltage U*st*, via the point b, having a maximum value of, for example, + 0.75 V for controlling the attenuators D*p*, D*s* to maximum attenuation, according to FIG. 2. On the output of the one block J1 a positive current appears in dependence on the signals delivered from the transmitter channel and on the output of the other block J2 a negative current appears in dependence on the signals coming from the line. The voltage UJ is thus dependent on which current being the greatest one. The minimum value of the voltage UJ is, however, limited to − 0.1 V, that is the forward voltage drop across the diode D. In the transmitting mode, the diode D is blocked due to the presence of positive current IM, but when switching to the receiving mode, the diode D will be conducting. When diode D changes from its blocked to its conducting state, then voltage U*st* = *Uo* and the attenuators D*p*, D*s* are adjusted to their quiescent attenuation value. When the diode D is fully conducting, that is when current flows therethrough, its voltage drop is approximately 0.1 V. This voltage drop enables the voltage Uo from the memory unit M to be reduced by approximately 0.1 V and the attenuators will be controlled to their minimum attenuation. In dependence on the value of the voltage Uo the attenuators will be controlled to a greater or a smaller amount, as it appears from the curves according to FIG. 2.

When the line signal to the level detector N exceeds a predetermined value (according to the example −25 dBm) the level detector will deliver an activation signal to the transistor Q1 and the latter will be brought to its conducting state causing one terminal of the resistor R2 to be grounded. Accordingly a charging of the capacitor Cm, via the resistor R2, is initiated, which charging occurs linearly with the time. The output voltage from the operational amplifier OP rises towards a positive value, since the voltage across its negative input, via the resistor R2, is connected to a negative voltage (earth) relative to the reference voltage Uref. Note the changing current I1 = Uref/R2. The value of the capacitor charge thus stored in the memory unit will be dependent on the time during which transistor Q1 is conducting which is dependent on the magnitude of the level of the incoming line signal. By charging the capacitor C*m* the voltage U*o* increases, feeding a still greater bias to the comparator voltage UJ, that is the control voltage U*st* increases. In the receiving mode, the attenuators Dp, Ds will thus be controlled to a great degree and the attenuation of the line signal will increase until the signal obtained from the receiver amplifier MF and sensed by the level indicator N has decreased so much that the activation signal to the transistor Q1 ceases and the charging of the capacitor Cm also ceases. Capacitor Cm, however, cannot discharge, as the negative input of the operational amplifier and the non-conducting transistors Q1 and Q2 have a very high resistance and the capacitor Cm has a great capacitance. Thus the output voltage U*o* will be practically unchanged during a determined time for example 15 *s* and independent of a decrease in the line level below the value previously sensed. The memory unit M, however, can be zero-set by that a zero setting signal or a pole changing signal appearing across the input of the monostable MV, whereby the latter is triggered to change its state causing transistor Q2 to conduct so that the capacitor Cm is discharged with the time constant R1 · Cm. The monostable returns after a certain time to its original state and a new value of the line level can be stored in the memory unit M. The resistor Rm has high value and is connected across the capacitor Cm so that the latter will be able to discharge slowly to decrease the value of the output voltage U*o*. Accordingly the attenuation in the receiver amplifier MF gradually decreases during a call, which is advantageous, since in practice it often occurs that two conversing persons have a higher voice level in the beginning than at the end of a call. The time constant R*m* · C*m* amounts to, for example, 1 minute. The utilization of the resistor R*m* introduces a certain memory loss into the memory unit M.

Figure 3:
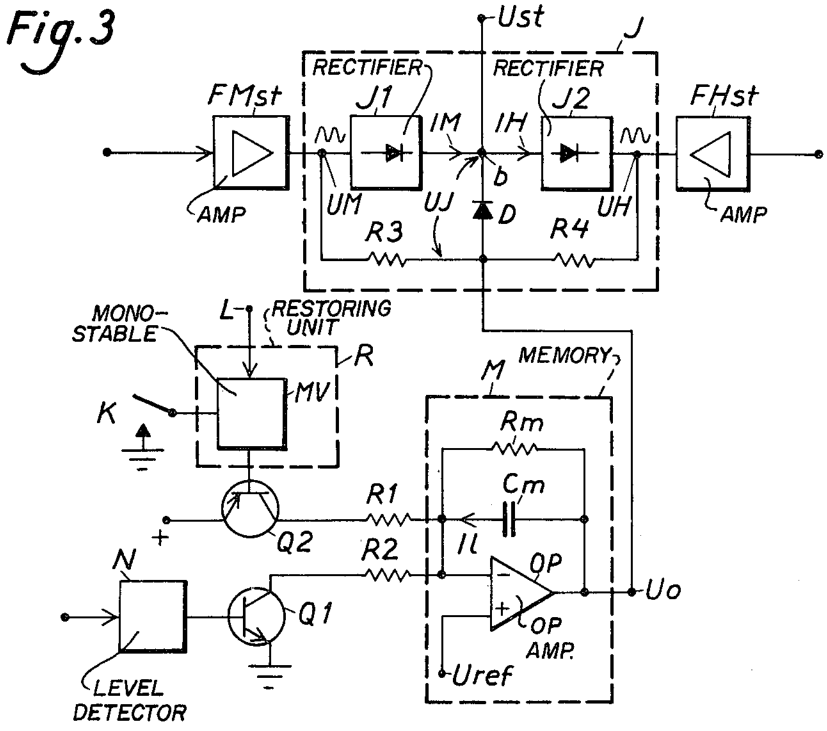
FIG. 3 shows a circuit diagram of some of the blocks according to FIG. 1.
Figure 4:
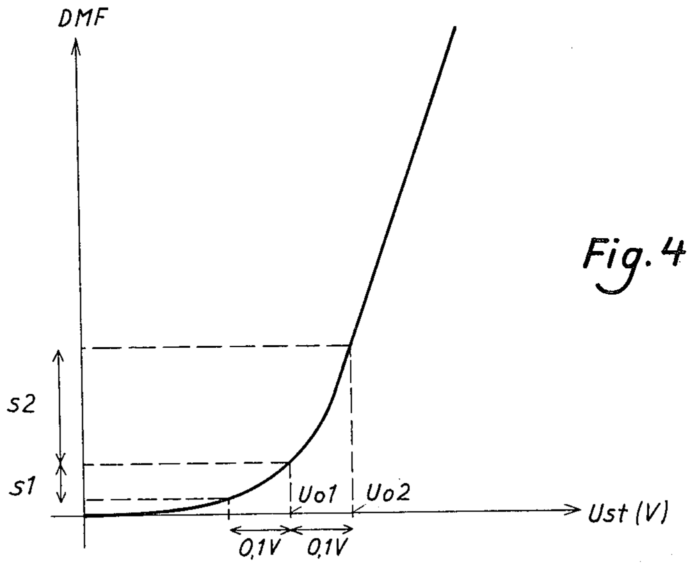
FIG. 4 shows a waveform of the attenuation characteristic in the receiver amplifier of the set as a function of the incoming control voltage.

The diagram according to FIG. 4 shows the total attenuation in the receiver channel and the total amplification in the transmitter channel, respectively, as a function of the control voltage Ust from the comparator unit J. The curve shows a value UJ = 0.1 V when opening to the receiving mode and a value UJ = +0.75 V when opening to the transmitting mode. By Uo1 and Uo2 two arbitrarily chosen bias voltages from the memory unit M are indicated. These voltages give an example of the changes obtained in the control of the receiver unit when the diode D according to FIG. 3 gives a forward voltage drop of 0.1 V, which is subtracted from the bias voltage U*o* and which forms the control voltage U*st*. As soon as the comparator unti J assumes a negative value the diode D will conduct, UJ decreases but is limited to the value 0.1 V and control to the minimum attenuation according to FIG. 2 takes place. The value of the quiescent attenuation and by that the minimum attenuation, that the attenuators assume, is determined by the value of the last obtained incoming line level stored in the memory unit M. When switching from the quiescent mode to the receiving mode, then UJ = 0.1 V according to above and from FIG. 4 it is realized that if the stored value in the memory unit M is U*o*1, a small change s1 of the attenuators is obtained, while at a higher bias voltate U*o*2 a higher value *s*2 of the change is obtained.

We claim:

1. In a loud speaking telephone set connected to a line and having a transmitter channel including amplification means and microphone and a receiver channel including attenuation means and a loud speaker, the set being in a transmitting mode when the signal level of the transmitter channel is greater than the signal level of the receiver channel and being in a receiving mode when the signal level of the receiver channel is greater than the signal level of the transmitter channel, a comparator means comparing the signal levels present in the transmitter and receiver channels for generating a mode control signal whose amplitude is a function of the operating mode of the set, amplification means in the transmitter channel and responsive to an output control signal for amplifying signals therein as a given function of the amplitude of the output control signal, and attenuator means in the receiver channel and responsive to the output control signal for attenuating signals therein in accordance with the given function of the amplitude of the output control signal so that there is a constant amplification from the speaker to the microphone to prevent feedback therebetween, the improvement comprising level detector means for generating an indicating signal as long as the signal in the receiver channel exceeds a given level, an analog memory means connected to said level detector means for storing an analog value related to the duration of the indicating signal and for transmitting a quiescent level indicating signal related to said analog value, and means connecting said analog memory means to the comparator means for superimposing the quiescent level indicating signal on to the mode control signal to form said output control signal whereby quiescent levels of amplification in the transmitter channel and attenuation in the receiver channel are obtained which are then changed in accordance with the operating mode of the telephone set.

2. A telephone set as claimed in claim 1 wherein said comparator means comprises a first and second rectifier element, separate amplifier means connecting said first and second rectifier elements to the transmitter and to the receiver channel, respectively, for sensing the signal level of each of said channels, and a unidirectional non-linear element having two electrodes, one of said electrodes being connected to the output of said analog memory means and the other of said electrodes being connected to a common connection point between said rectifier elements, said point forming the output of said comparator means, when in the transmitting mode, said unidirectional element being in its nonconducting state whereby the mode control signal is added to said quiescent level and indicating signal to provide a maximum value of said output control signal for controlling at least said attenuator means to maximum attenuation, and when in the receiving mode said unidirectional element being in its conducting state whereby the mode control signal is substracted from said quiescent level indicating signal to provide a decrease in the amplitude of said output control signal for controlling said attenuator means to a minimum attenuation.

3. A telephone set as claimed in claim 2 wherein said comparator means includes means for generating no mode control signal when the telephone set is neither in a transmit nor receive mode so that the quiescent level indicating signal then transferred from said memory means is the output control signal which controls at least the attenuator means to a quiescent attenuation level.

4. A telephone set as claimed in claim 1 wherein the memory means comprises charge storage means, a source of charging current and switch means connected to said charge storage means for transferring charging current from said source or charging current to said charge storage means, said switch means being connected to said level detector means and being activatable when said level detector means indicates that the signal fed to the loud speaker exceeds said predetermined threshold value.

5. A telephone set as claimed in claim 4 wherein said charge storage means comprises an integrating operational amplifier having an input connected to said switch means and an output connected to the comparator means.

* * * * *